United States Patent [19]
Raza et al.

[11] Patent Number: 6,055,241
[45] Date of Patent: Apr. 25, 2000

[54] ARCHITECTURE FOR A DUAL SEGMENT DUAL SPEED REPEATER

[75] Inventors: S. Babar Raza, Santa Clara; M. Magdy Talaat, Mountain View; Yun-Che Wang, Los Altos, all of Calif.; Michael J. Kasper, Hillsboro, Oreg.

[73] Assignee: Cypress Semiconductor Corp., San Jose, Calif.

[21] Appl. No.: 08/970,059

[22] Filed: Nov. 13, 1997

[51] Int. Cl.$^7$ .................................................. H04L 12/413
[52] U.S. Cl. .............................................. 370/445; 370/408
[58] Field of Search .................................... 370/445, 446, 370/407, 408, 465, 468, 501, 502

[56] References Cited

U.S. PATENT DOCUMENTS

| 5,596,575 | 1/1997 | Yang et al. ............................... 370/468 |
| 5,742,602 | 4/1998 | Bennett ..................................... 370/401 |
| 5,887,050 | 3/1999 | Fenske et al. ............................... 379/4 |

OTHER PUBLICATIONS

S. Babar Raza et al., U.S.S.N. 08/970,058 Architecture for a Dual Segment Speed Repeater, filed Nov. 13, 1997.

*Primary Examiner*—Douglas W. Olms
*Assistant Examiner*—David R Vincent
*Attorney, Agent, or Firm*—Christopher P. Maiorana, P.C.

[57] ABSTRACT

The present invention concerns a method and architecture comprising a first circuit, a second circuit, and a logic circuit coupled to said first and second circuits. The first segment generally comprises a first repeater core configured to operate at one of a plurality of speeds and a first port. The second segment generally comprises a second repeater core configured to operate at one of a plurality of speeds and a second port. A logic circuit may be configured to couple each of the first and second ports to either the first or second repeater core.

21 Claims, 5 Drawing Sheets

ARCHITECTURE FOR A DUAL SEGMENT DUAL SPEED REPEATER

FIELD OF THE INVENTION

The present invention relates to network repeaters generally and, more particularly, to a method and architecture for providing a dual segment, dual speed network repeater.

BACKGROUND OF THE INVENTION

Referring to FIG. 1, a repeater system 10 is shown implementing a port control section 12 and a port control section 14 that can each operate at different speeds. The circuit 10 also comprises a repeater core 16 and a repeater core 17. The repeater core 16 is shown running at 10 Mbits per second and the repeater core 17 is shown running at 100 Mbits per second. The port control section 12 is shown having a speed select block 18, a multiplexer/select block 20 and a port 22. The port control section 14 is shown having a multiplexer/select block 32, a speed select block 34 and a port 36. A basic repeater segment (sometimes referred to as a repeater) comprises one of the repeater cores 16 or 17 and two or more of the ports 20 and 22. The multiplexer/select block 20 connects the port 22 to either the repeater core 16 or the repeater core 17. The speed select block 18 determines the speed of the port 22 and, by providing a signal to the multiplexer/select circuit 20, connects the port 22 to the repeater core 16 or the repeater core 17, whichever is operating at the appropriate speed. The speed select block 34 provides a similar function to the speed select block 18 by providing a signal to the multiplexer/select circuit 32 to connect the port 36 to the repeater core 16 or the repeater core 17, whichever is operating at the appropriate speed. For example, if the port 22 operates at 10 Mbits per second, the multiplexer/select circuit 20 will connect the port 22 to the repeater core 16, which is operating at 10 Mbits per second. Conversely, if the port 22 can operate at 100 Mbits per second, the multiplexer/select circuit 20 will connect the port 22 to the repeater core 17, which is operating at 100 Mbits per second. While the particular repeater cores 16 and 17 may run at different speeds from each other, they generally have a fixed speed that does not vary.

If all of the ports are required to run at a single speed, load balancing is not generally possible since the ports will be configured to the same repeater core 16 or 17. The number of repeater cores 16 and 17 may vary according to the configuration of the particular network.

SUMMARY OF THE INVENTION

The present invention concerns a method and architecture comprising a first port control section, a first repeater core, a second port control section, a second repeater core, and a logic circuit coupled to the first and second port control sections and the first and second repeater cores. The first repeater core and the second repeater core each may be configured to operate at one of a plurality of speeds. A logic circuit may be configured to couple each of the first and second ports to either the first or second repeater cores.

The objects, features and advantages of the present invention include providing a dual segment, dual speed repeater core allowing (i) a particular repeater core to operate at a number of speeds, (ii) a port to operate with a particular repeater core and (iii) a port from one repeater core to automatically switch to another repeater core.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention concerns a method and architecture for providing a dual segment, dual speed repeater core. A number of repeater cores may be capable of running at a number of speeds, for example, 10 Mbits per second or 100 Mbits per second. A number of ports may be independently connected, through a number of multiplexers, to each of the repeater cores.

Figure 1:
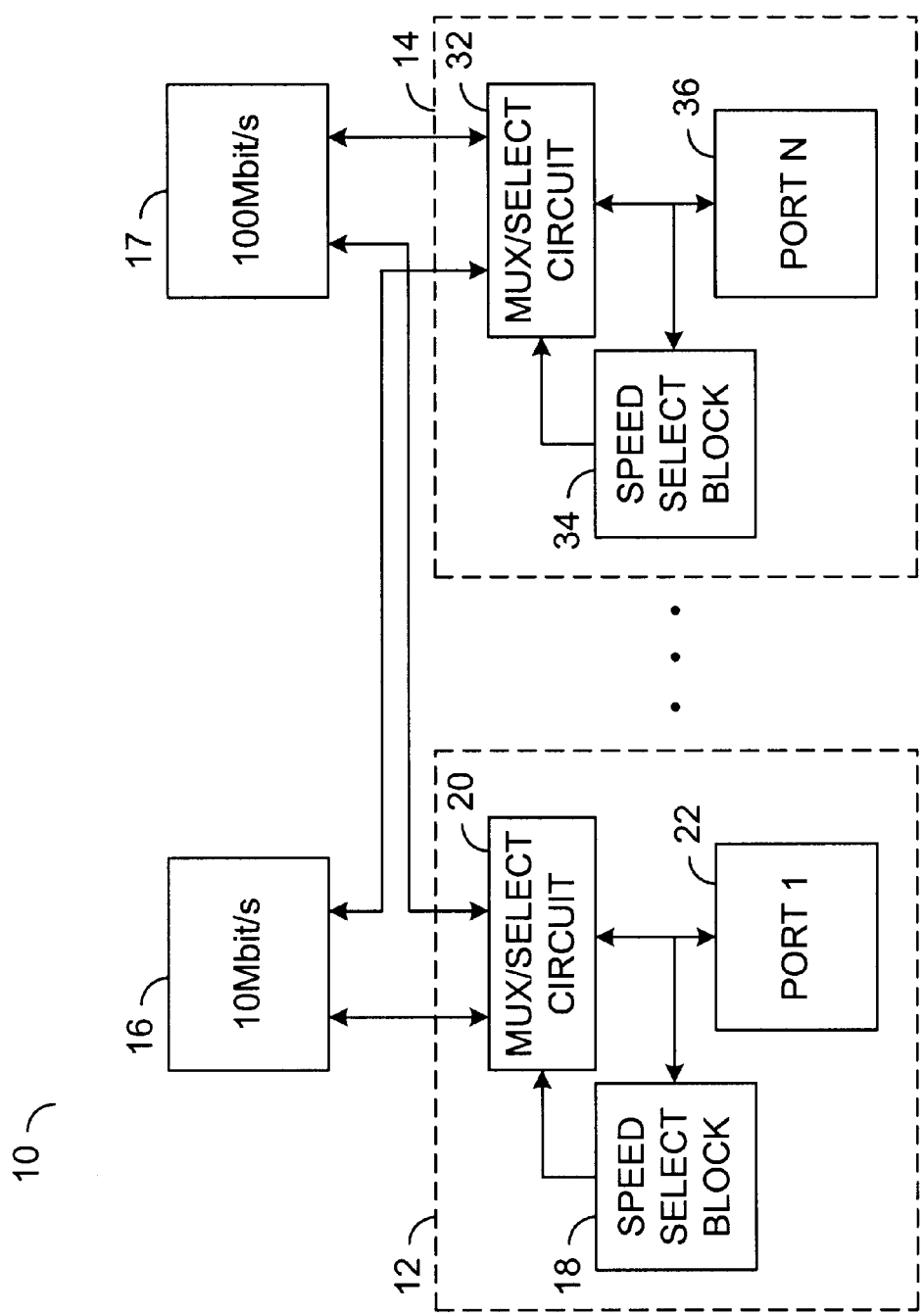
FIG. 1 is a block diagram of a conventional repeater system implementing two repeater cores, each running at different speeds.
Figure 2:
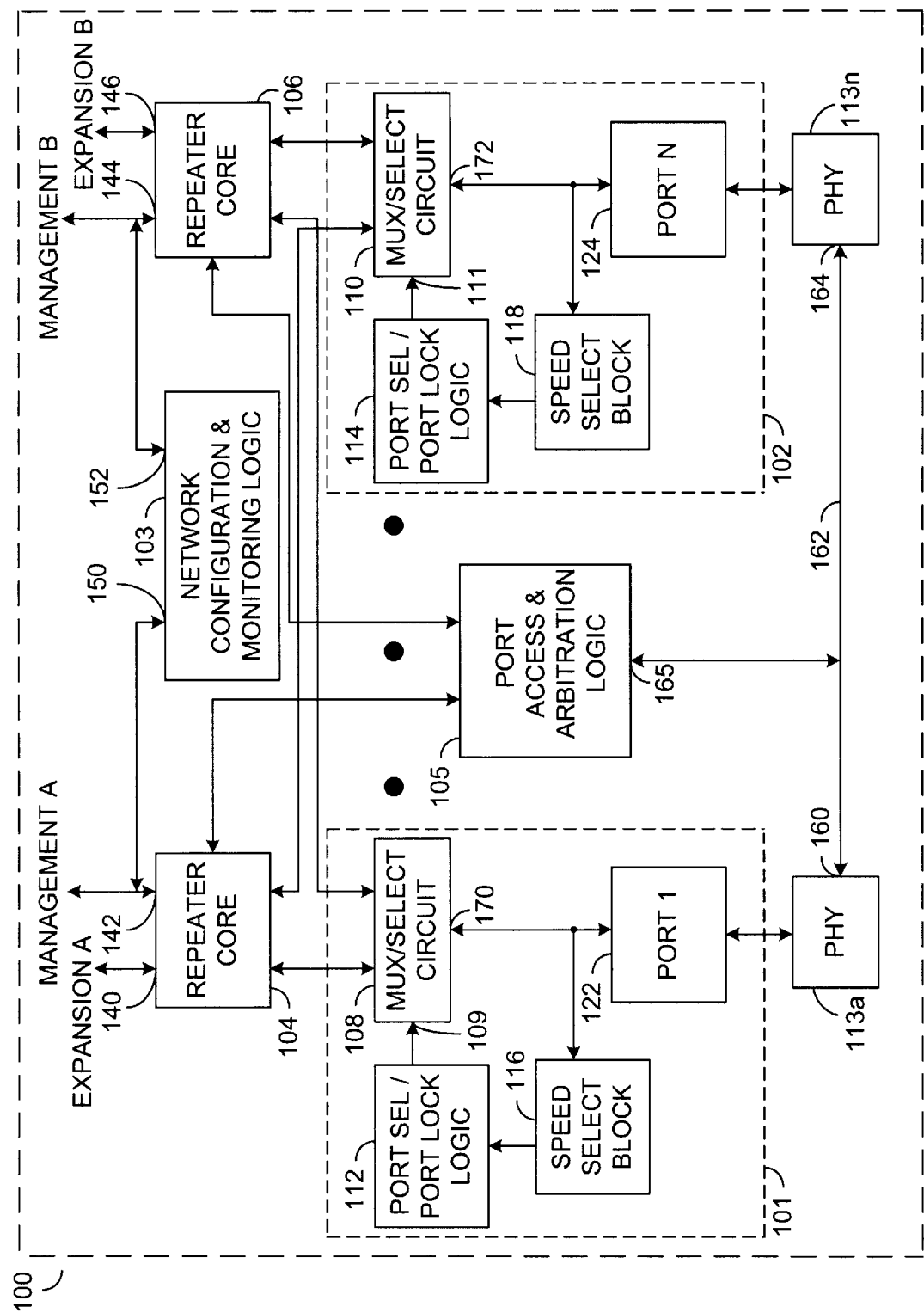
FIG. 2 is a block diagram of a preferred embodiment of the present invention.

Referring to FIG. 2, a block diagram of a repeater system 100 is shown in accordance with a preferred embodiment of the present invention. The repeater system 100 generally comprises a port control section (or circuit) 101, a port control section (or circuit) 102, a network configuration and monitoring logic block (or circuit) 103, a repeater core 104, a port access and arbitration logic block (or circuit) 105 and a repeater core 106. Physical Layer Devices (PHYs) 113a–n may be external devices that may be coupled to the repeater system 100. The port control section 101 generally comprises a multiplexer/select block (or circuit) 108, a port select/port lock logic block (or circuit) 112, a speed select block (or circuit) 116 and a port 122. The port control section 102 generally comprises a multiplexer/select block (or circuit) 110, a port select/port lock logic block (or circuit) 114, a speed select block (or circuit) 118 and a port 124.

The repeater core 104 may operate at a number of speeds, such as 10 Mbits per second (generally referred to as speed_1) or 100 Mbits per second (generally referred to as speed_2). Different speeds may be provided in accordance with the design criteria of a particular application. For example, speedy1 may be 100 Mbits per second and speed_2 may be 1 Gbits per second. While the example in FIG. 2 is shown with the specific example of a speed_1 and a speed_2, more than two speeds may be provided to meet particular design constraints.

The repeater core 104 includes an input/output 140 that may be connected to an expansion bus A and an input/output 142 that may be connected to a management bus A. The repeater core 106 includes an input/output 144 that may be connected to a management bus B and an input/output 146 that may be connected to an expansion bus B. As a result, the repeater core 104 and the repeater core 106 may be independently expandable. This type of expansion may allow the repeater core 104 and the repeater core 106 to function as a hub between a number of single speed operating segments (to be described in more detail in connection with FIG. 5).

The repeater core 104 includes the input/output 142 that may provide a management interface through which a management entity (which may be a combination of software and hardware) may access the information generated by the repeater core 104 and/or write information into the control registers (not shown) of the repeater core 104. An example of a management entity implemented in a network repeater may be found in a co-pending application entitled "Circuit(s), Method(s) and Architecture For Configurable Packet Re-timing In Network Repeater Hubs", U.S. Ser. No. 08/935,982, filed Sep. 23, 1997, which is herein incorporated by reference in its entirety. The repeater core 106 includes a similar input/output 144 that may receive and/or present information to the management entity. The management entity may also read the status of each of the repeater cores 104 and 106.

The network configuration and monitoring logic block 103 includes an input/output 150 that may be coupled to the management bus A and an input/output 152 that may be coupled to the management bus B. As a result, the logic block 103 may also read/write to registers that may be shared by the repeater cores 104 and 106.

The PHY 113a has an input/output 160 that may be connected to a bus 162. The bus 162 may also be coupled to an input/output 164 of the PHY 113n as well as to an input/output 165 of the port access and arbitration logic 105. In one example, the bus 162 may be implemented as a MDC/MDIO bus.

The multiplexer/select circuit 108 (and 110) may receive a control signal at an input 109 (and 111), that may be generated by the port select/port lock logic 112. The control signal may indicate the speed that the port 122 (or 124) operates. After the speed of the port 122 (or 124) is detected, the switching of the port 122 (or 124) from one repeater core 104 (or 106) to the other is generally dependent on certain predetermined conditions. If both of the repeater cores 104 and 106 are running at the same speed, and the particular port 122 or 124 is operating at a different speed, the port generally gets disabled and the management entity may be informed through the network configuration and monitoring logic 103. If both of the repeater cores 104 and 106 are running at different speeds, the port is configured to one of the repeater cores 104 or 106 and the port speed does not match the segment speed (i) if the port is locked to that segment it will be disabled or (ii) if the port is not locked, the port may be switched to the segment that is running at the same speed. The logic for the port locking may be implemented in a register or other programming means, which may be stored in the port select/port lock logic block 112 (to be described in more detail in connection with FIG. 3).

The locking of a particular port 122 or 124 may be advantageous when, inter alia, two repeater cores are operating on different Local Area Networks (LANs). In such a configuration, it may not be desirable to have a port automatically switch from one segment (e.g., the repeater core 104) to another segment (e.g., the repeater core 106). Another reason for locking a particular port 122 (or 124) to a particular repeater core (e.g., 104 or 106) may be to balance the load of network traffic between the repeater cores 104 or 106. A register may be implemented in the port select/port lock logic block 112 (114) which contains a bit for each port 122 or 124 that generally indicates whether the port is locked or not. The register may be programmed through the management buses A or B. Alteratively, a single global bit may be implemented in a register that indicates whether port switching in general is acceptable or not for each of the repeater cores 104 or 106 in the repeater system 100. If this global bit is configured to indicate that port switching is acceptable, switching of a particular port may occur.

Registers may be introduced to communicate to the management entity when a network condition occurs such as (i) specifically when a port is disabled, (ii) when a speed mismatch between the particular repeater core 104 (or 106) and the particular port 122 (or 124) occurs during a time when the port is locked to a segment, or (iii) when the port is unlocked and both segments are running at the same speed which does not match the port speed. An additional register may be implemented that informs the management entity when a particular port 122 (or 124) is automatically switched from one segment 104 (or 106) to the other segment 104 (or 106). The following Table 1 illustrates the selection of the multiplexers 108 and 110 for the ports 122 (or 124):

TABLE 1

| Port Speed | Segment_104 | Segment_106 | Sel |
|---|---|---|---|
| Speed 1 | Speed 1 | Speed 1 | Port Select Register |
| Speed 1 | Speed 1 | Speed 2 | Port Locked: Port Sel Reg |
| Speed 1 | Speed 2 | Speed 1 | Port Unlocked: Speed Select |
| Speed 2 | Speed 1 | Speed 1 | Port Select Register |
| Speed 2 | Speed 2 | Speed 2 | Port Select Register |
| Speed 2 | Speed 1 | Speed 2 | Port Locked: Port Sel Reg |
| Speed 2 | Speed 2 | Speed 1 | Port Unlocked: Speed Select |
| Speed 1 | Speed 2 | Speed 2 | Port Select Register |

When both of the repeater cores 104 and 106 are operating at the same speed, whether the port speed matches or not, the port select/port lock logic block 108 may present a control signal to configure the multiplexer/select block 108. When both of the repeaters 104 and 106 are not operating at the same speed and the port speed does not match the segment speed, then the selection of the port depends on the status of the port lock register. If the port lock register indicates that the port is locked to the segment, then the selection is the same as when the port select register is configured for that port. However, if the port is unlocked, then the select signal selects the segment for which the port speed matches. In the case when the two segments speeds match each other and the port speed does not match with them, the port gets disabled. However, the port may stay configured to the default segment.

Figure 3:
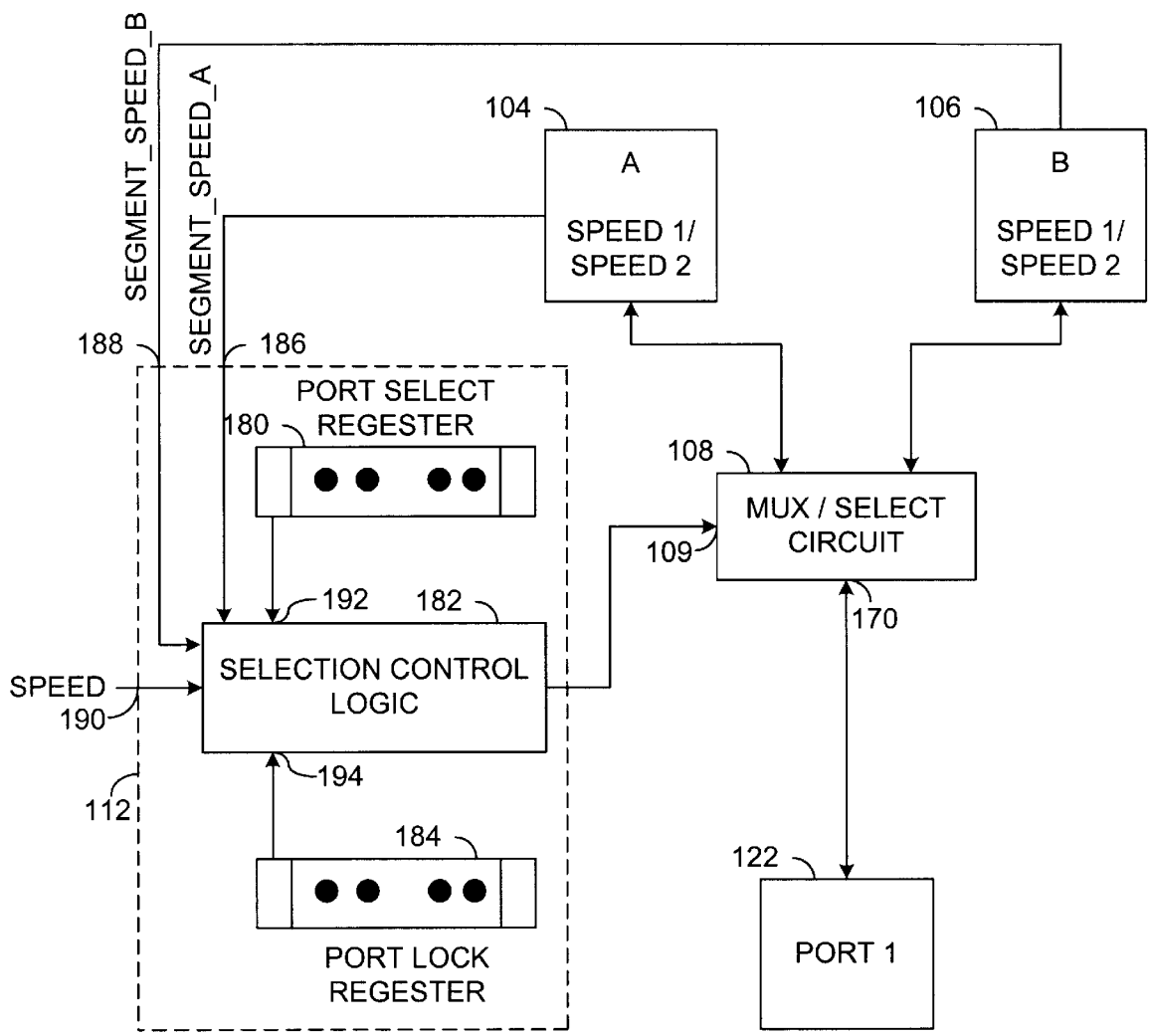
FIG. 3 is a more detailed block diagram of the port select and port lock logic of the present invention.

Referring to FIG. 3, a more detailed block diagram of the port select/port lock logic 112 is shown implemented in conjunction with the repeater core 104, the repeater core 106, the multiplexer/select circuit 108 and the port 122. The port select/port lock logic 112 comprises a port select register 180, a section control logic 182 and a port lock register 184. The port select/port lock logic 112 also has an input 186 that may receive a speed indication signal from the repeater core 104 indicating the speed of operation of the repeater core 104 and an input 188 that receives a speed indication signal that indicates the speed of operation of the repeater core 106. Additionally, the port select/port lock logic 112 has an input 190 that may receive a speed signal from the speed select block 116. The speed signal received at the input 190 generally detects the speed of operation of the port 122 and may be received from the speed select block 116 (or 118). The port select/port lock logic 112 may present the control signal to the input 109 the multiplexer/select circuit 108 that determines which repeater (e.g., 104 or 106) the port 122 may be coupled to.

The example of FIG. 3 illustrates two separate repeater cores 104 and 106 each capable of running at two different speeds. As a result, a 2-1 multiplexer 108 may be implemented which may connect the port 122 to either the repeater core 104 or the repeater core 106. The port select register 180 and the port lock register 184 provide signals to inputs 192 and 194 of the selection control logic block 182. The port select register 180 generally stores a bit of information for each port (e.g., 122) of the network 100. The bit generally indicates the default configuration of the particular port selected by the management entity. The port lock register 184 generally stores a lock bit for each port (e.g., 122) generally indicating whether the particular port is locked to the particular repeater core (104 or 106) when selected by the port select register. The speed signal received at the input 190 generally indicates what speed the particular port (e.g., 122) is running. As a result, the selection control logic 182 generally determines which repeater core (e.g., 104 or 106) should be connected to the port (e.g., 122).

Figure 4:
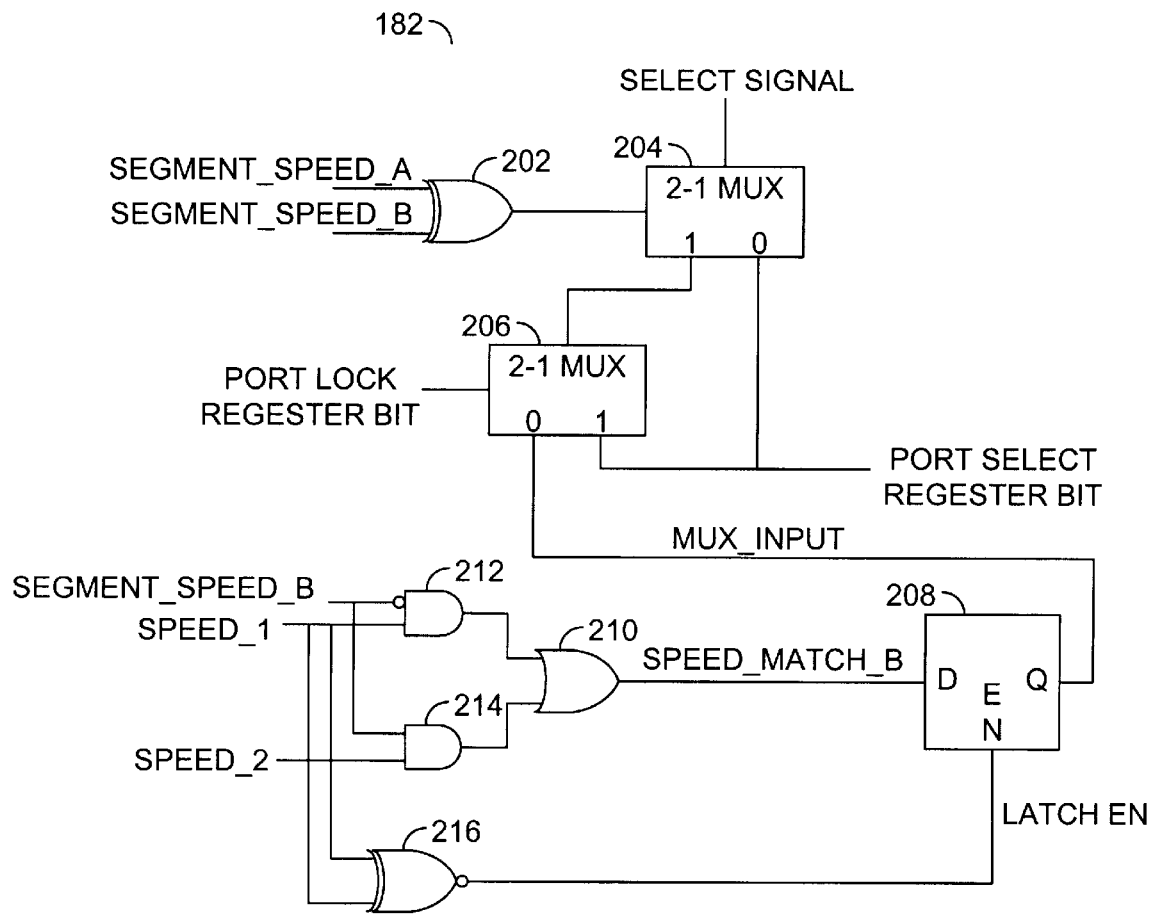
FIG. 4 is a circuit diagram of the selection control logic of the present invention.

Referring to FIG. 4, an example of logic implementing the selection control logic block 182 is shown. The logic block 182 generally comprises an XOR gate 202, a multiplexor 204, a multiplexor 206, a memory element 208, an OR gate 210, an AND gate 212, an AND gate 214 and an XNOR gate 216. Other examples of logic may be implemented accordingly to meet the design criteria of a particular application. For the example shown in FIG. 4, various definitions may be used to illustrate an exemplary embodiment of the control logic. For example, port select register value of zero may indicate the segment A is selected and a value of one may indicate the segment B is selected. A port lock register value of zero may indicate an unlocked state while a value of one may indicate a locked state. A segment speed value of zero may indicate a first speed (e.g., speed_1) and a one may indicate a second speed (e.g, speed_2). A select signal value of zero may indicate that the port should be connected to the segment A, while a select signal value of one may indicate that the port should be connected to the segment B.

The select logic may be implemented such that the values indicated in TABLE 1 are presented. When both segments are running at the same speed, the port select register 180 generally determines the segment to which the port will be connected to. When the two segment speeds do not match, and if the port is locked to a particular segment, then the port select register determines the configuration. Otherwise, the speed match with the segment determines where the port should be connected. The following TABLE 2 illustrates an exemplary truth table for such an implementation:

the port speed. There are four general conditions that may be possible (i) when the speed_1 equals one and the speed_2 equals zero (i.e., port speed equals speed_1), (ii) when the speed1 equals zero and the speed_2 equals one (i.e., the port speed equals speed_2), (iii) when the speedy_1 equals one and the speed_2 equals one (i.e., don't care because both speeds cannot be detected on the same port) and (iv) when the speed_1 and the speed_2 are both zero's, which may imply that the port is not connected or that the port is connected at speed which is not detectable by the present implementation. For conditions where port speeds are detected, the speed_match_B signal may be used to determine the select signal. Otherwise, the previous value stays latched.

The repeater system 100 may be configured in several different general modes of operation. In one mode, the repeater system 100 may operate as a twelve-port repeater (e.g., where n=12 in FIG. 2) and shared PHYs (Physical Layer Devices) may be connected to the port 122, 124, etc. In another mode (e.g., a DTE mode) the repeater system 100 may be configured such that eight shared PHYs may be connected along with two dedicated PHY/DTE (Data Terminal Equipment) interfaces. One DTE interface may be provided for each segment 104 (and 106). With such a configuration, when the PHY mode is selected, the repeater system 100 generally operates as a ten-port repeater. When the DTE mode is selected, the two ports may be used to bridge the two segments together using a bridge or a switch. The DTE mode may be used for in-band management. The selection between the various modes may be implemented with an external selection pin, or may be implemented using software configured through a register.

The port 122 (and 124) may be connected to a MII (Media Independent Interface) which provides the signals CRS, COL, receive (e.g., RX_CLK), and transmit (e.g., TX_EN) along with a receive enable (e.g., RX_EN), which is generally a non-standard MII signal that is generally used to enable the PHY's receive bus of the particular PHYs. Additionally, a link signal is generally provided which may be a non-standard MII signal used by the PHY devices to indicate that the link is in operation. The link signal may be directly connected from each PHY to the network 100. The MII signals, such as TX_D [3:0], RX_D[3:0], RX_DV,

TABLE 2

| Segment Speed | | Port Speed | | Latch | speed | | |
|---|---|---|---|---|---|---|---|
| Seg A | Seg B | Speed_1 | Speed_2 | EN | match_B | Mux_Input | Comments |
| 1 | 0 | 0 | 0 | 0 | 0 | Last Value | Link Down |
| 1 | 0 | 0 | 1 | 1 | 0 | speed_match_B | Switch |
| 1 | 0 | 1 | 0 | 1 | 1 | speed_match_B | Switch |
| 1 | 0 | 1 | 1 | 0 | 1 | Last Value | Don't care |
| 0 | 1 | 0 | 0 | 0 | 0 | Last Value | Link Down |
| 0 | 1 | 0 | 1 | 1 | 1 | speed_match_B | Switch |
| 0 | 1 | 1 | 0 | 1 | 0 | speed_match_B | Switch |
| 0 | 1 | 1 | 1 | 0 | 1 | Last Value | Don't care |

The first two columns generally show the segment speed. The segment speed illustrated as Seg A and Seg B is shown generally for the conditions where the values are complementary since this logic is not executed when both segment speeds are the same. This results from the case that when the segments are operating at the same speed, the logic may connect the particular port (e.g., 122) to the selected repeater core. As such, these conditions are generally "don't care" conditions. The third and fourth columns generally indicate TX_ER, RX_ER, TX_CLK may be generated per segment and may be multiplexed externally to be connected to the PHYs.

Figure 5:
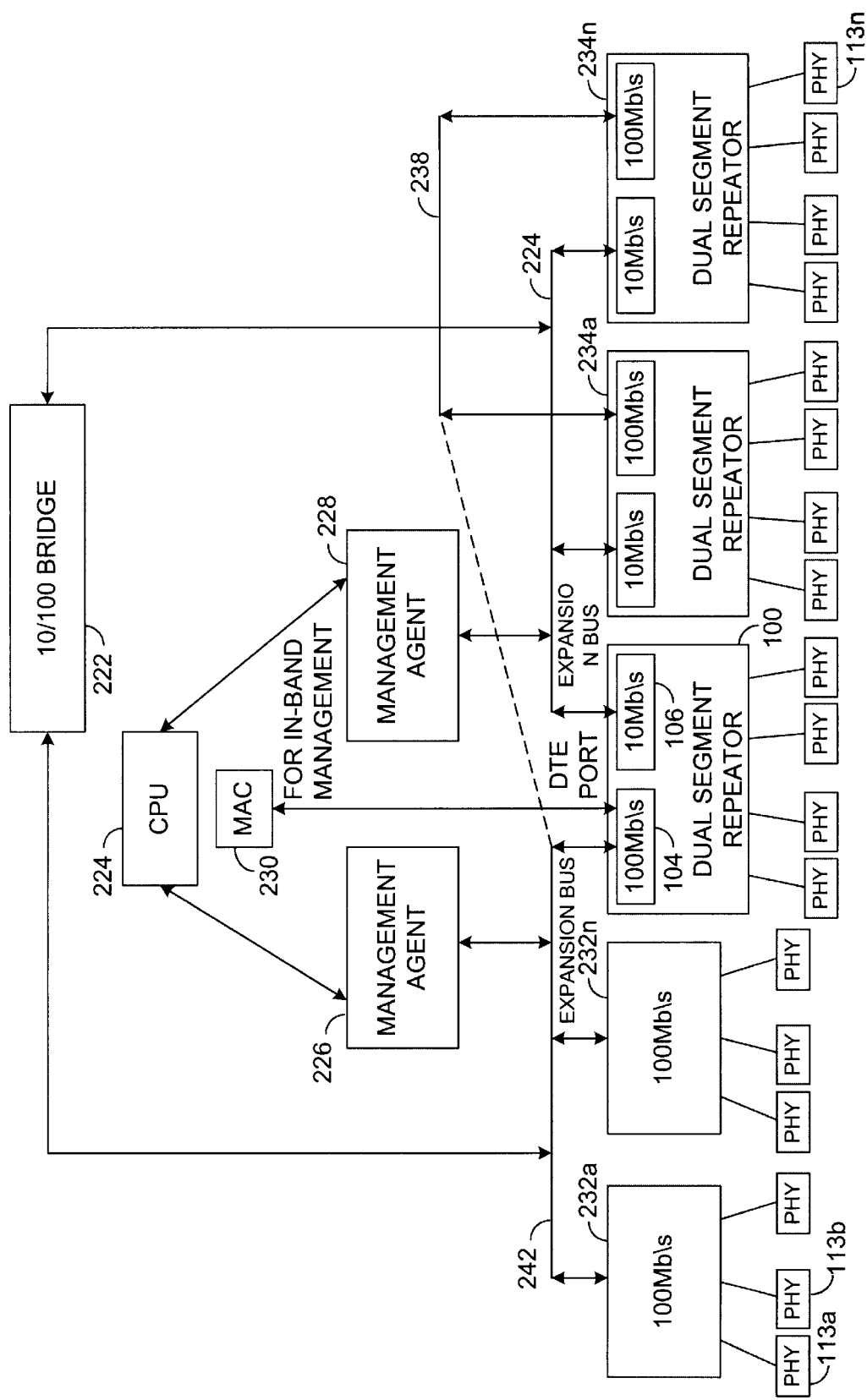
FIG. 5 illustrates the present invention implemented in the context of a hub between segments operating at different speeds.

Referring to FIG. 5, an example of a three segment network is shown. The example comprises the repeater system 100, a number of physical layer devices 113a–113n, a bridge 222, a CPU 224, a first management agent 226, second management agent 228, a media access controller (MAC) 230, a number of repeaters 232a–232n, a number of repeaters 234a–234n and a bus 238. The circuit 100 may provide a hub between the segment 238 and the segment 242. For example, an expansion bus 242 may connect the repeater cores 232a–232n to the repeater core 104 and an expansion bus 244 may connect the repeater cores 234a–234n (which each may or may not be implemented as a dual segment repeater core) to the repeater core 106. The bus 238 may connect (if part of the same local area network) a 100 Mbps portion of the repeater 234n to the 100 Mbps portion of the repeater system 100 as well as to the repeater cores 232a–232n. The bridge 222 may be needed if two network segments are part of the same local area network.

While the invention has been particularly shown and described with reference to the preferred embodiments thereof, it will be understood by those skilled in the art that various changes in form and details may be made without departing from the spirit and scope of the invention.

We claim:

1. A circuit comprising:
   a first circuit comprising (i) a first repeater core configured to operate at any one of a plurality of operating speeds and (ii) a first port;
   a second circuit comprising (i) a second repeater core configured to operate at any one of a plurality of operating speeds and (ii) a second port;
   a logic circuit coupled to said first and second repeater cores and said first and second ports, said logic circuit configured to (i) couple either of said first port or said second port to either of said first repeater core or said second repeater core and (ii) configure the operating speeds of said first repeater core and said second repeater core.

2. The circuit according to claim 1, further comprising:
   a first multiplexer circuit configured to couple said first port to either said first repeater core or said second repeater core in response to a first control signal;
   a second multiplexer circuit configured to couple said second port to either said first repeater core or said second repeater core in response to a second control signal.

3. The circuit according to claim 2, wherein said first port operates at a first speed and said second port operates at a second speed, said first and second speeds being the same or different, and said circuit further comprises:
   a first speed select circuit configured to generate a first speed signal indicating said first speed; and
   a second speed select circuit configured to generate a second speed signal indicating said second speed.

4. The circuit according to claim 3, further comprising:
   a first port select circuit comprising a first port select register configured to disable said first port; and
   a second port select circuit comprising a second port select register configured to disable said second port.

5. The circuit according to claim 4, wherein:
   said first port select circuit is configured to generate said first control signal in response to (i) said first and second speeds, (ii) the operating speeds of said first and second repeater cores and (iii) a signal from said first port select register; and
   said second port select circuit is configured to generate said second control signal in response (i) said first and second speeds, (ii) the operating speeds of said first and second repeater cores and (iii) a signal from said second port select register.

6. The circuit according to claim 1, further comprising:
   a plurality of third circuits each comprising (i) a repeater core configured to operate at one of a plurality of speeds and (ii) a port.

7. The circuit according to claim 6, wherein said logic circuit is additionally coupled to said plurality of third circuits.

8. The circuit according to claim 7, wherein said logic circuit is configured to (i) independently couple each of said plurality of ports to one of said plurality of repeater cores and (ii) configure the operating speeds of each of said plurality of repeater cores.

9. A hub comprising the circuit of claim 1, wherein a first segment operating at one of said plurality of operating speeds is coupled to said first repeater core and a second segment operating at one of said plurality of operating speeds is coupled to said second repeater core, wherein said first segment and said second segment are independently expandable.

10. The circuit according to claim 1, wherein said circuit operates in (i) a first mode wherein one of said ports operates as a data terminal equipment interface or (ii) a second mode wherein additional ports may be coupled to said first or second repeater cores.

11. The circuit according to claim 1, wherein at least one of said first port and said second port is coupled to at least one repeater core operating at the configured operating speed of said first repeater core or said second repeater core.

12. The circuit according to claim 2, further comprising:
   a first management bus coupled to said first repeater core;
   a second management bus coupled to said second repeater core; and
   one or more physical layer devices coupled to said first and second management buses.

13. A circuit comprising:
   first means for transferring information at any one of a plurality of operating speeds;
   second means for transferring information at any one of a plurality of operating speeds; and
   logic means coupled to said first and second means for transferring information, said logic means for configuring the operating speeds of said first and second means for transferring information.

14. The circuit according to claim 13, further comprising first and second ports for receiving information at first and second receiving speeds and configured to be coupled to said first and second means for transferring information, said logic means for configuring the operating speeds of said first and second means for transferring information in response to said first and second receiving speeds.

15. A method for dynamically configuring a port to a repeater core comprising the steps of:
   configuring a first operating speed of a first repeater core;
   configuring a second operating speed of a second repeater core; and
   coupling (i) said first port o4 said second port to (ii) said first repeater core or said second repeater core.

16. The method according to claim 15, further comprising the steps of:
   if said speed of said second port matches an operating speed of a said first repeater core, coupling said second port to said first repeater core.

17. The method according to claim 16, further comprising the step of:
   if said speed of said second port matches an operating speed of a second repeater core, coupling said second port to said second repeater core.

18. The method according to claim 17, further comprising the steps of:
- detecting a data transfer speed for each of a plurality of ports;
- configuring a data receiving speed for each of a plurality of repeater cores; and
- coupling a first one of said plurality of ports to a first one of said plurality of repeater cores in response to (i) the speed of the ports and (ii) the configuration of the repeater cores.

19. The method according to claim 17, further comprising the step of:
- coupling a third one of said plurality of ports to said first repeater core or said second repeater core in response to an operating speed of said third one of said plurality of ports.

20. A method for dynamically configuring a plurality of ports to a plurality of repeater cores comprising the steps of:
- detecting a speed of each of said plurality of ports;
- configuring a speed of each of said plurality of repeater cores;
- independently coupling one of said ports to one of said repeater cores.

21. The method according to claim 20, further comprising the step of:
- repeating said independently coupling step for each of said plurality of ports.

* * * * *